United States Patent
Pascal et al.

(10) Patent No.: US 11,655,760 B2
(45) Date of Patent: May 23, 2023

(54) AIR INTAKE OF AN AIRCRAFT TURBOJET ENGINE NACELLE COMPRISING VENTILATION ORIFICES FOR A DE-ICING FLOW OF HOT AIR

(71) Applicant: SAFRAN NACELLES, Gonfreville-l'Orcher (FR)

(72) Inventors: Sébastien Laurent Marie Pascal, Moissy-Cramayel (FR); Jean-Michel Paul Ernest Nogues, Moissy-Cramayel (FR); Marc Versaevel, Moissy-Cramayel (FR); François Chauveau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/427,565

(22) PCT Filed: Feb. 5, 2020

(86) PCT No.: PCT/EP2020/052894
§ 371 (c)(1),
(2) Date: Jul. 30, 2021

(87) PCT Pub. No.: WO2020/161200
PCT Pub. Date: Aug. 13, 2020

(65) Prior Publication Data
US 2022/0162990 A1 May 26, 2022

(30) Foreign Application Priority Data
Feb. 8, 2019 (FR) ..................... 1901281

(51) Int. Cl.
*F02C 7/045* (2006.01)
*F02C 7/047* (2006.01)

(52) U.S. Cl.
CPC .............. *F02C 7/045* (2013.01); *F02C 7/047* (2013.01)

(58) Field of Classification Search
CPC ............ B64D 33/02; B64D 2033/0206; B64D 2033/0233; F02C 7/04; F02C 7/045; F02C 7/047; F05D 2250/286; F05D 2260/96
See application file for complete search history.

(56) References Cited

U.S. PATENT DOCUMENTS

| 3,933,327 A | 1/1976 | Cook et al. |
| 4,154,256 A | 5/1979 | Miller |

(Continued)

FOREIGN PATENT DOCUMENTS

| EP | 0921293 A1 | 6/1999 |
| EP | 1111226 A1 | 6/2001 |

(Continued)

OTHER PUBLICATIONS

Search Report from the French Intellectual Property Office on corresponding FR application (FR1901281) dated Oct. 15, 2019.

(Continued)

*Primary Examiner* — Alain Chau
*Assistant Examiner* — Sean V Meiller
(74) *Attorney, Agent, or Firm* — KOS IP Law LLP

(57) ABSTRACT

The invention relates to an air intake of an aircraft turbojet engine nacelle extending along an axis X, in which an air flow circulates from upstream to downstream, the air intake comprising an inner wall and an outer wall which are connected by a leading edge and an inner partition so as to delimit an annular cavity, the air intake comprising means for injecting at least one hot air flow into the inner cavity and at least one ventilation orifice formed in the outer wall in order to allow the hot air flow to escape after heating the (Continued)

inner cavity, the air intake comprising at least one acoustic member positioned in the inner cavity facing the ventilation orifice so as to modify the acoustic resonance frequencies and/or to attenuate the acoustic waves formed in the inner cavity via the ventilation orifice.

19 Claims, 12 Drawing Sheets

(56) References Cited

U.S. PATENT DOCUMENTS

| | | | |
|---|---|---|---|
| 4,240,250 | A | 12/1980 | Harris |
| 4,674,714 | A | 6/1987 | Cole et al. |
| 4,696,442 | A | 9/1987 | Mazzitelli |
| 4,738,416 | A | 4/1988 | Birbragher |
| 5,257,498 | A | 11/1993 | Nikkanen et al. |
| 5,841,079 | A * | 11/1998 | Parente ................ F02C 7/047 244/134 B |
| 6,131,855 | A | 10/2000 | Porte |
| 6,592,078 | B2 | 7/2003 | Porte et al. |
| 6,698,691 | B2 * | 3/2004 | Porte ................ B64D 33/02 244/134 B |
| 6,702,233 | B1 | 3/2004 | DuPont |
| 6,848,656 | B2 | 2/2005 | Linton |
| 8,382,039 | B2 | 2/2013 | Calder |
| 8,434,724 | B2 | 5/2013 | Chelin et al. |
| 8,657,567 | B2 | 2/2014 | Cloft et al. |
| 8,931,252 | B2 | 1/2015 | Richardson et al. |
| 10,221,765 | B2 | 3/2019 | Alstad et al. |
| 2006/0219475 | A1 | 10/2006 | Olsen et al. |
| 2009/0194633 | A1 | 8/2009 | De Souza et al. |
| 2015/0001003 | A1 | 1/2015 | Lan et al. |
| 2016/0017751 | A1 | 1/2016 | Caruel |
| 2019/0390601 | A1 | 12/2019 | Casado-Montero et al. |
| 2022/0136439 | A1 | 5/2022 | Pacal et al. |
| 2022/0195921 | A1 | 6/2022 | Gomez et al. |

FOREIGN PATENT DOCUMENTS

| | | |
|---|---|---|
| FR | 2772341 A1 | 6/1999 |
| FR | 2802573 A1 | 6/2001 |
| FR | 2840879 A1 | 12/2003 |

OTHER PUBLICATIONS

International Search Report and Written Opinion on corresponding PCT application (PCT/EP2020/052894) from International Searching Authority (EPO) dated May 25, 2020.
Search Report from the French Intellectual Property Office on related FR application (FR1901277) dated Oct. 22, 2019.
Search Report from the French Intellectual Property Office on related FR application (FR1901279) dated Nov. 19, 2019.
International Search Report and Written Opinion on related PCT application (PCT/EP2020/051511) from International Searching Authority (EPO) dated Mar. 19, 2020.
International Search Report and Written Opinion on related PCT application (PCT/EP2020/051515) from International Searching Authority (EPO) dated Apr. 20, 2020.
Non-Final Office Action on related US application (U.S. Appl. No. 17/427,548) dated May 12, 2022.
Non-Final Office Action on related US application (U.S. Appl. No. 17/427,563) dated Jul. 22, 2022.
Final Office Action on related US application (U.S. Appl. No. 17/427,548) dated Aug. 22, 2022.

* cited by examiner

AIR INTAKE OF AN AIRCRAFT TURBOJET ENGINE NACELLE COMPRISING VENTILATION ORIFICES FOR A DE-ICING FLOW OF HOT AIR

TECHNICAL FIELD

The present invention relates to the field of aircraft turbojet engines and is more particularly directed to an air intake of an aircraft turbojet engine nacelle comprising a de-icing device.

In a known manner, an aircraft comprises one or more turbojet engines to allow its propulsion by acceleration of an air stream that circulates from upstream to downstream in the turbojet engine.

With reference to FIG. 1, a turbojet engine 100 extending along an axis X and comprising a fan 101 rotatably mounted about axis X in a nacelle comprising an external shell 102 in order to accelerate an air stream F from upstream to downstream is represented. Hereinafter, the terms upstream and downstream are defined with respect to the circulation of the air stream F. The nacelle comprises at its upstream end an air intake 200 comprising an internal wall 201 pointing to axis X and an external wall 202 which is opposite to the internal wall 201, the walls 201, 202 are connected through a leading edge 203 also known as "air intake lip". Thus, the air intake 200 allows the incoming air stream F to be separated into an internal air stream INT guided by the internal wall 201 and an external air stream EXT guided by the external wall 202. The walls 201, 202 are connected through the leading edge 203 and an internal partition wall 205 so as to delimit an annular cavity 204 known to the person skilled in the art as "D-DUCT". Hereinafter, the terms internal and external are defined radially with respect to axis X of the turbojet engine 100.

In a known manner, during the flight of an aircraft, due to temperature and pressure conditions, ice is likely to accumulate at the leading edge 203 and the internal wall 201 of the air intake 200 and form blocks of ice that are likely to be ingested by the turbojet engine 100. Such ingestions have to be avoided in order to improve the life of the turbojet engine 100 and reduce malfunctions.

To eliminate ice accumulation, with reference to FIG. 1, it is known to provide a de-icing device comprising an injector 206 of a hot air stream FAC into the internal cavity 204. The circulation of such a hot air stream FAC allows, by heat exchange, the internal wall 201, external wall 202 and lip 203 to be heated and thus ice accumulation which melts or evaporates as it accumulates to be avoided. In a known manner, with reference to FIGS. 2 and 3, the internal cavity 204 comprises ventilation openings 103 formed in the external wall 202 of the air intake 200 so as to allow discharge of the hot air stream FAC after heating of the internal cavity 204. As an example, with reference to FIG. 3, each ventilation opening 103 has an elongated, preferably oblong, shape along the engine axis X.

In practice, acoustic nuisance appears during the circulation of the external air stream EXT over the ventilation openings 103, in particular, hissing and/or resonances. Such acoustic nuisance is increased when the de-icing device is inactive.

An immediate solution to eliminate this drawback is to provide a ventilation duct connecting the internal cavity 204 to ventilation openings offset from the exterior wall of the air intake. Preferably, such a ventilation duct allows the ventilation openings to be positioned in a zone in which the velocity of the outside air stream EXT is lower, thereby limiting acoustic disturbances. In practice, the addition of a ventilation duct increases the overall size and mass of the turbojet engine, which is not desired. In addition, a ventilation duct has the drawback of ejecting a hot FAC air stream in proximity to heat-sensitive downstream zones, for example, of composite material.

One of the objects of the present invention is to provide an air intake comprising ventilation openings formed in the external wall of the air intake and not inducing acoustic nuisance.

Incidentally, a curved guide grille for the hot air stream when exhausted is known from patent application U.S. Pat. No. 5,257,498, but it has no impact on acoustic nuisance.

SUMMARY

The invention relates to an air intake of an aircraft turbojet engine nacelle extending along an axis X in which an air stream circulates from upstream to downstream, the air intake extending circumferentially about axis X and comprising an internal wall pointing to axis X to guide an internal air stream INT and an external wall, which is opposite to the internal wall for guiding an external air stream EXT, the walls being connected through a leading edge and an internal partition wall so as to delimit an annular cavity, the air intake comprising means for injecting at least one hot air stream FAC into the internal cavity and at least one ventilation opening formed in the external wall to allow exhaust of the hot air stream FAC after heating the internal cavity.

The invention is remarkable in that it comprises at least one member for disturbing the external air stream EXT, positioned upstream of the ventilation opening, which extends projecting outwardly from the external wall. Advantageously, such a disturbance member allows formation of sound pressure fluctuations to be avoided in the vicinity of the ventilation opening.

Preferably, the disturbance member has a width at least equal to half the width of the ventilation opening, more preferably to the width of the ventilation opening.

According to one aspect, the distance between the disturbance member and the ventilation opening is between 0.5 and 3 times the length of the disturbance member.

According to another aspect, the distance between the disturbance member and the ventilation opening is less than 2 times the length of the ventilation opening.

According to another aspect, the disturbance member has a height between 0.2 and 1 time the length of the disturbance member.

Preferably, the disturbance member is mounted as an insert to the external wall.

According to one aspect, the external wall comprises a through opening for mounting that is positioned upstream of the ventilation opening. The disturbance member extends through the through opening for mounting, preferably from within the internal cavity.

According to one aspect, the disturbance member is a deflection member that comprises a domed external surface, preferably, with a profile having an elliptical portion. This advantageously allows external air to be deflected not to interact at high velocity with the ventilation opening.

According to another aspect, the disturbance member is a vortex generating member. The formation of vortices, that is, turbulent aerodynamic structures, allows formation of acoustic waves to be avoided. In particular, the acoustic nuisance is low when the dimensions of the turbulent aerodynamic structures are far from those of a ventilation opening.

Preferably, the vortex generating member is polyhedral, preferably tetrahedral or pyramidal.

Preferably, the vortex generating member has a convex shape.

Preferably, the vortex generating member comprises a plurality of projecting ridges.

The invention relates to an air intake of an aircraft turbojet engine nacelle extending along an axis X in which an air stream circulates from upstream to downstream, the air intake extending circumferentially about axis X and comprising an internal wall pointing to axis X to guide an internal air stream INT and an external wall, which is opposite to the internal wall to guide an external air stream EXT, the walls being connected through a leading edge and an internal partition wall so as to delimit an annular cavity, the air intake comprising means for injecting at least one hot air stream FAC into the internal cavity and at least one ventilation opening formed in the external wall to allow exhaust of the hot air stream FAC after heating the internal cavity.

The invention is remarkable in that the ventilation opening comprises an upstream edge whose circumferential profile is discontinuous to generate turbulence and/or a downstream edge whose radial profile is aerodynamic to limit formation of pressure fluctuations.

Advantageously, the turbulent aerodynamic structures formed by the upstream edge make it possible not to interact with the ventilation opening so as not to generate acoustic waves. Advantageously, the aerodynamic radial profile of the downstream edge allows the flow of the external air stream to be modified in order to avoid any hissing phenomenon.

According to one aspect, the circumferential profile of the upstream edge has at least one point of curvature discontinuity in the vicinity of which the direction of the tangent of the profile is modified by an angle greater than 60°, preferably less than 180°.

Preferably, the upstream edge comprises between 1 and 8 points of curvature discontinuity for turbulence generation.

Preferably, the upstream edge comprises at least two turbulence generation patterns, preferably at least four.

Preferably, the turbulence generation pattern has a scallop or chevron shape.

According to one aspect, the upstream edge is inscribed within the aerodynamic lines of the external wall.

According to another aspect, the upstream edge comprises an outwardly projecting portion.

Preferably, the projecting portion forms an angle with the overall plane of the ventilation opening that is less than 45°.

Preferably, the downstream edge has a rounded, preferably domed, radial profile.

According to one aspect, the ventilation opening defines an aerodynamic line as an extension of the external surface of the external wall of the air intake. The downstream edge is positioned internally to the aerodynamic line.

According to one aspect, the external wall comprising a through opening for assembling, the ventilation opening is formed in a ventilation member mounted in the through opening for assembling, preferably from inside.

The invention relates to an air intake of an aircraft turbojet engine nacelle extending along an axis X in which an air stream circulates from upstream to downstream, the air intake extending circumferentially about axis X and comprising an internal wall pointing to axis X to guide an internal air stream INT and an external wall, which is opposite to the internal wall, to guide an external air stream EXT, the walls being connected through a leading edge and an internal partition wall so as to delimit an annular cavity, the air intake comprising means for injecting at least one hot air stream FAC into the internal cavity and at least one ventilation opening formed in the external wall to allow exhaust of the hot air stream FAC after heating the internal cavity.

The invention is remarkable in that it comprises at least one acoustic member positioned in the internal cavity facing the ventilation opening so as to modify acoustic resonance frequencies and/or attenuate acoustic waves formed in the internal cavity via the ventilation opening.

Such an acoustic member makes it possible to modify resonance frequencies or attenuate acoustic waves so as to limit acoustic nuisance likely to bother local residents. The effects of acoustic nuisance are thus reduced.

Preferably, with the ventilation opening comprising a normal axis, the acoustic member comprises at least one acoustic surface extending substantially orthogonal to the normal of the ventilation opening.

Preferably, the projection of the acoustic surface onto the plane of the ventilation opening along the normal axis is larger than the ventilation opening.

According to one aspect, with the ventilation opening comprising a normal axis, the acoustic surface being spaced from the ventilation opening along the normal axis by a spacing distance, the spacing distance is greater than the length of the ventilation opening.

According to another aspect, with the ventilation opening comprising a normal axis, the acoustic surface being spaced from the ventilation opening along the normal axis by a spacing distance, the spacing distance is less than twice the length of the ventilation opening.

According to one aspect, the acoustic member comprises at least one absorption material to form an acoustic absorption surface.

According to one aspect, the acoustic member is in the form of a corner piece comprising an acoustic treatment surface and a mounting surface.

According to one aspect, the acoustic member is attached to the internal surface of the external wall.

According to one aspect, the acoustic member is attached to the internal wall of the internal cavity.

According to one aspect, the internal partition wall comprises a convex upstream face pointing to the ventilation opening.

According to one aspect, the internal partition wall comprises a concave portion extending substantially orthogonal to the normal of the ventilation opening.

By virtue of the invention, sources and effects of the acoustic nuisance relating to the ventilation openings are treated alternatively or simultaneously in order to improve the comfort to the users located in the aircraft but also that of the local residents. Advantageously, the invention makes it possible to integrate into a high-temperature thermal environment (circulation of the hot flow) without impacting the discharge flow rate and/or increasing the aerodynamic drag.

The invention can be implemented in a practical manner to act on the acoustic frequencies desired to be modified.

BRIEF DESCRIPTION OF THE DRAWINGS

The invention will be better understood upon reading the following description, which is given only by way of example, and referring to the appended drawings given as non-limiting examples, in which identical references are given to similar objects and in which.

It should be noted that the figures set out the invention in detail for implementing the invention, said figures of course being able to serve to better define the invention if necessary.

DETAILED DESCRIPTION

Figure 1:
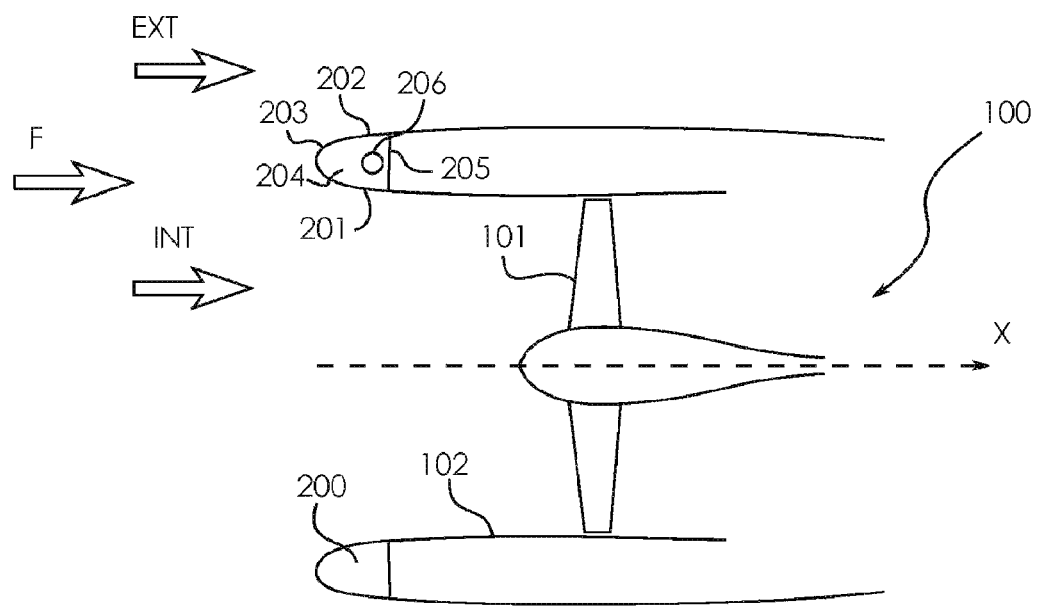
FIG. 1 is a schematic representation of an axial cross-section view of a turbojet engine according to prior art.
Figure 2:
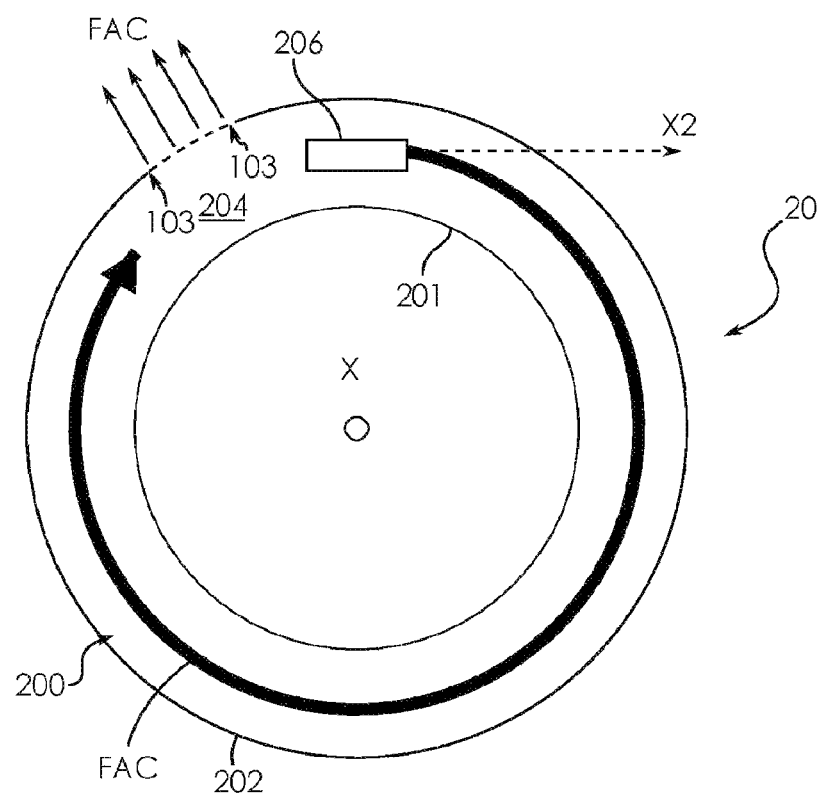
FIG. 2 is a schematic representation of a cross-section view of an air intake according to prior art in which a hot air stream for de-icing circulates.
Figure 3:
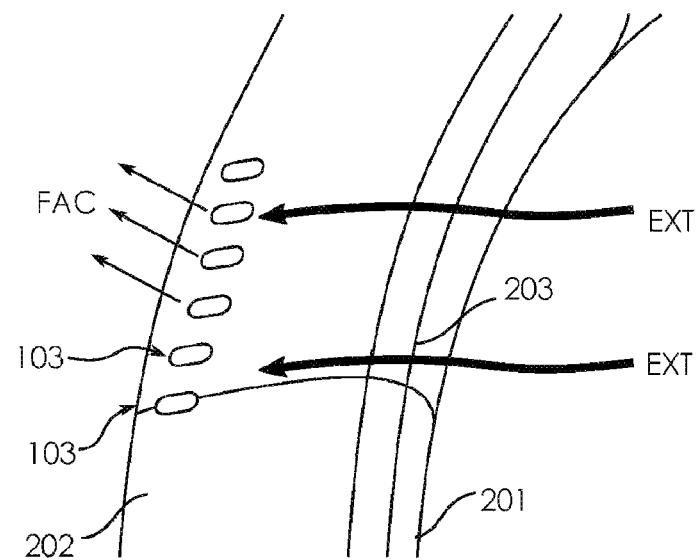
FIG. 3 is a schematic perspective representation of a plurality of ventilation openings according to prior art.
Figure 4:
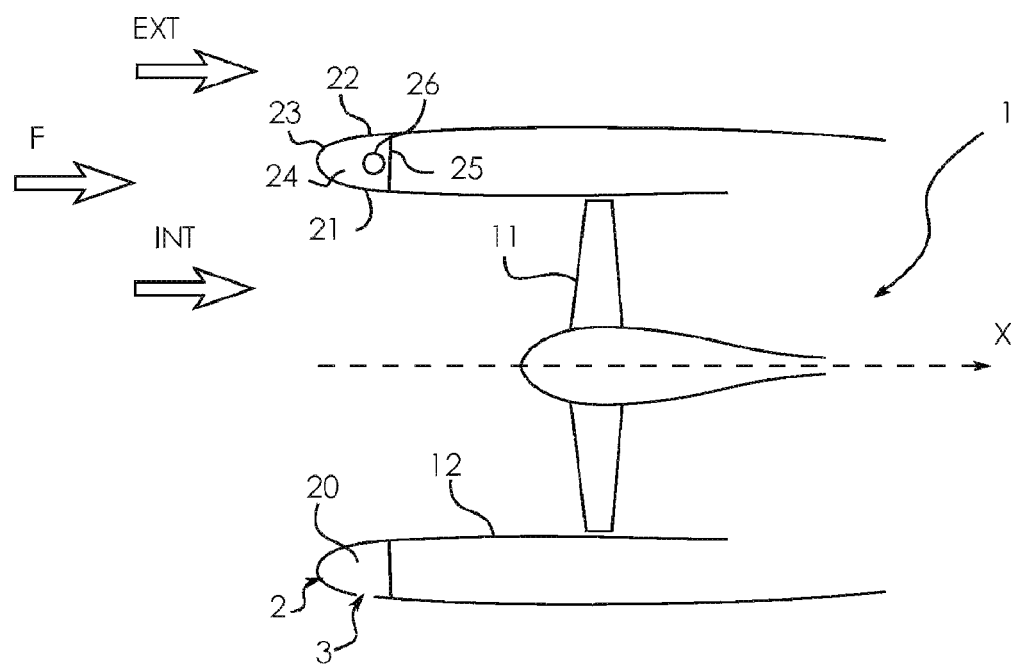
FIG. 4 is a schematic representation of an axial cross-section view of a turbojet engine according to prior art.

The invention will be set out with reference to FIG. 4 showing a turbojet engine 1 extending along an axis X and comprising a fan 11 mounted rotatably about axis X in a nacelle 2 comprising an external shell 12 in order to accelerate an air stream F from upstream to downstream. Hereinafter, the terms upstream and downstream are defined with respect to the circulation of the air stream F. The nacelle 2 comprises at its upstream end an air intake 2 comprising an internal wall 21 pointing to axis X and an external wall 22 which is opposite to the internal wall 21, the walls 21, 22 are connected through a leading edge 23 also referred to as "air intake lip". Thus, the air intake 2 allows the incoming air stream F to be separated into an internal air stream INT guided by the internal wall 21 and an external air stream EXT guided by the external wall 22. The walls 21, 22 are connected through the leading edge 23 and an internal partition wall 25 so as to delimit an annular cavity 24 known to the skilled person as "D-DUCT". Hereinafter, the terms internal and external are defined radially with respect to axis X of the turbojet engine 1.

The air intake 2 comprises a de-icing device comprising means for injecting 26 a hot air stream FAC into the internal cavity 24, for example, an injector. The circulation of such a hot air stream FAC allows, by heat exchange, the internal wall 201, external wall 202 and lip 203 to be heated and thus ice accumulation which melts or evaporates as it accumulates to be avoided. As illustrated in FIG. 4, the internal cavity 24 comprises one or more ventilation openings 3 formed in the external wall 22 of the air intake 2 so as to allow the hot air stream FAC to be discharged after heating the internal cavity 24. In practice, the ventilation openings 3 are positioned upstream of the injector 26 relative to the point of injection of the hot air stream FAC into the air intake 2, where upstream is defined in this sentence with respect to the circumferential circulation of the hot air stream from upstream to downstream in the circumferential air intake 2.

Figure 5:
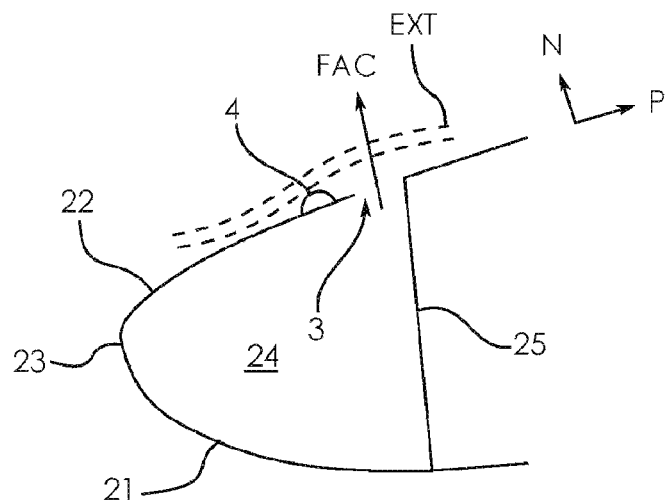
FIG. 5 is a schematic representation in an axial cross-section view of an air intake comprising an upstream disturbance member.
Figure 6:
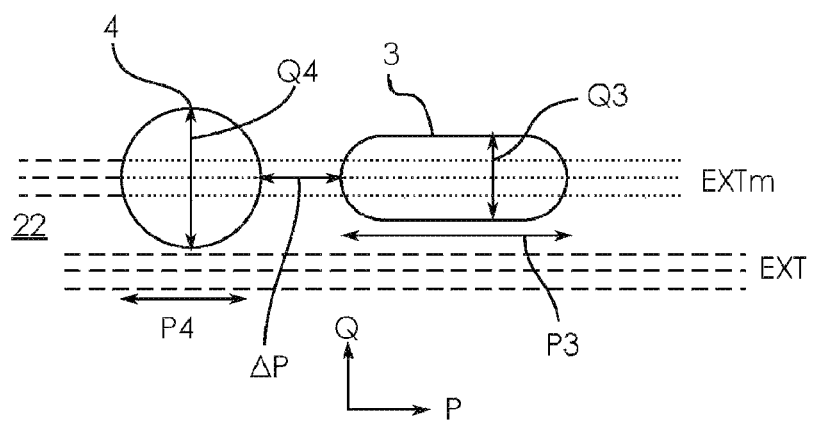
FIG. 6 is a top schematic representation of an upstream disturbance member associated with a ventilation opening.

According to one aspect of the invention, with reference to FIGS. 5 and 6, the air intake 2 comprises at least one disturbance member 4 for the external air stream EXT, positioned upstream of a ventilation opening 3, which extends projecting outwardly from the external wall 22. In other words, the disturbance member 4 makes it possible to act on the excitation causing the acoustic nuisance by reducing its influence.

Hereinafter, the invention is set forth in an orthogonal reference frame P, Q, N in which axis P extends along the external wall from upstream to downstream, axis N extends normally to the ventilation opening 3 from inside to outside and axis Q extends tangentially.

The ventilation opening 3 is defined in the orthogonal reference frame P, Q, N. To this end, the ventilation opening 3 comprises a length P3 defined along axis P and a width Q3 defined along axis Q as illustrated in FIG. 6.

In order to be able to optimally influence the upstream external air stream EXT, that is the acoustic excitation, the disturbance member 4 has a width Q4 at least equal to half the width Q3 of the ventilation opening 3, preferably to the width Q3 of the ventilation opening 3 as illustrated in FIG. 6. Preferably, the widths Q3, Q4 are of the same order of magnitude to limit aerodynamic disturbances. Also, the distance ΔP, defined along axis P, between the disturbance member 4 and the ventilation opening 3 is between 0.5 and 3 times the length P4 of the disturbance member 4. Preferably, the distance ΔP is less than 2 times the length P3 of the ventilation opening 3. This advantageously allows the external air stream EXT to be disturbed prior to its interaction with the ventilation opening 3 while limiting drag.

$0.5*P4 \leq \Delta P \leq 3*P4$ [Math. 1]

$\Delta P \leq 2*P3$ [Math. 2]

Figure 7:
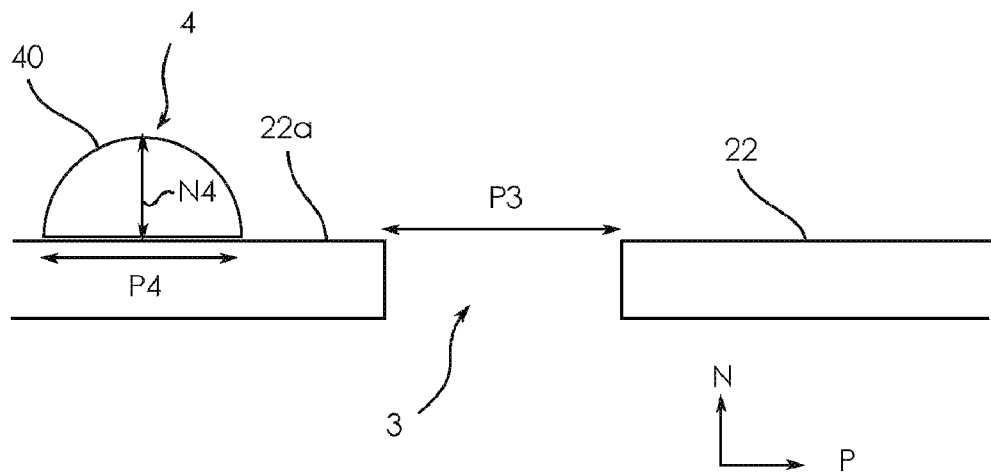
FIG. 7 is a close-up schematic representation of a first type of mounting of a deflection member.

Even more preferably, as illustrated in FIG. 7, the disturbance member 4 has a height N4, defined along axis N, between 0.2 and 1 time the length P4 of the disturbance member 4. Such a restricted height allows an acoustic interaction of the external air stream EXT with the ventilation opening 3 to be avoided while limiting aerodynamic disturbances.

According to one aspect of the invention, with reference to FIG. 7, the disturbance member 4 is of the same material as the external wall 22 or attached as an insert to its external surface 22a, for example, by bonding, welding or the like. According to another aspect of the invention, with reference to FIG. 8, the external wall 22 comprises a through opening 400 for mounting, positioned upstream of the ventilation opening 3. The disturbance member 4 extends through the through opening 400 for mounting so as to extend projecting outwardly from the external wall 22. In the example shown in FIG. 8, the disturbance member 4 comprises a mounting base 41 configured to be attached to the internal surface 22b of the external wall 22, in particular, by bonding welding, riveting or the like. In other words, the disturbance member 4 can be mounted from outside (FIG. 7) but also from inside (FIG. 8) depending on mounting and overall size restrictions.

Two embodiments of a disturbance member 4 will now be set forth in detail.

In a first embodiment, with reference to FIGS. 5 to 8, the disturbance member is a deflection member configured to deflect the external air stream EXT in order to prevent it from having a grazing incidence during its interaction with the ventilation opening 3. The formation of acoustic pressure fluctuations in the vicinity of the ventilation opening 3 is avoided, thereby reducing acoustic nuisance.

Figure 8:
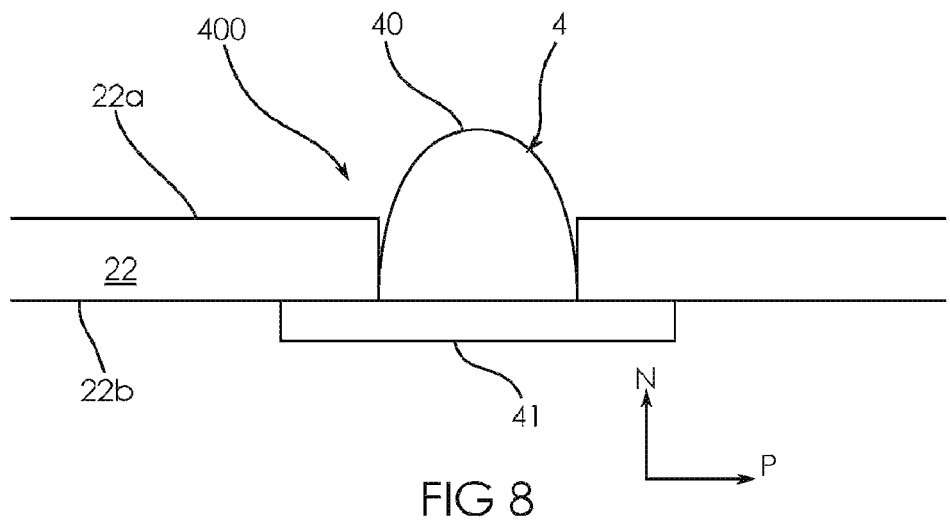
FIG. 8 is a close-up schematic representation of a second type of mounting of a deflection member.

Preferably, the deflection member comprises an external surface 40 that is domed. Advantageously, this prevents too high a deviation of the flow of the modified external air stream EXTm. Preferably, the external surface 40 has a portion of elliptical profile, that is, inscribed within an elliptical perimeter along an axial cross-sectional plane (N, P) as illustrated in FIGS. 5, 7 and 8. Such an external surface 40 allows to modify stream lines without generating a significant increase in drag. The dynamic flow remains minimally disturbed and is simply deflected.

Figure 9:
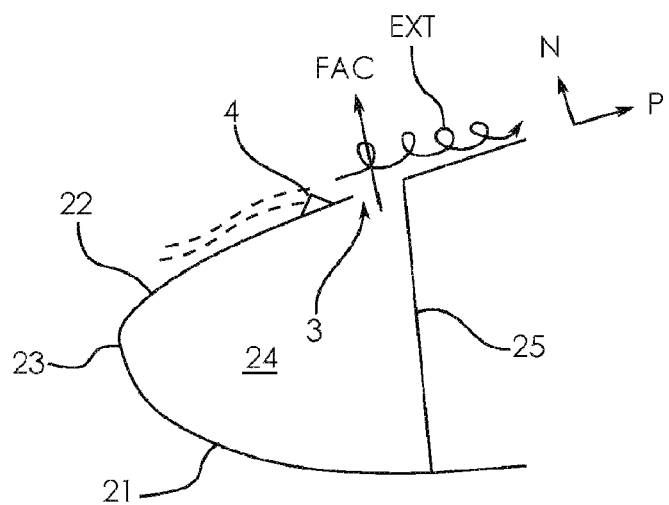
FIG. 9 is a schematic representation in an axial cross-section view of an air intake comprising an upstream vortex generating member.
Figure 10:
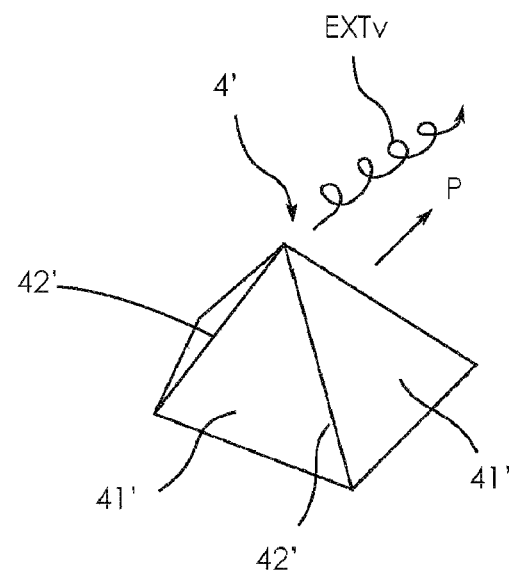
FIG. 10 is a schematic perspective representation of a first embodiment of an upstream vortex generating member.
Figure 11:
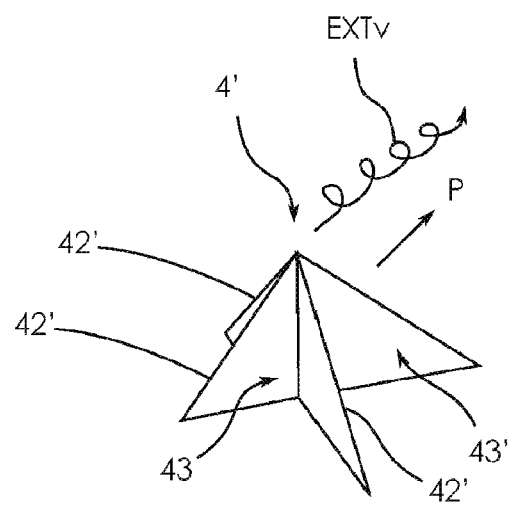
FIG. 11 is a schematic perspective representation of a second embodiment of an upstream vortex generating member.

In a second embodiment, with reference to FIGS. 9 to 11, the disturbance member is a vortex generating member 4' in order to create aerodynamic disturbances. Vortices are aerodynamic structures with a turbulent character, which prevents the generation of acoustic pressure fluctuations due to the interaction between the external stream EXT and the ventilation opening 3.

The geometrical dimensions previously set out for the disturbance member apply to the deflection member and the vortex generating member. They will not be detailed again.

As illustrated in FIGS. 9 to 11, the vortex generating member 4' is polyhedral, preferably tetrahedral (triangle base) or pyramidal (square base). The presence of faces and/or ridges allows generation of vortices EXTv as illustrated in FIG. 9 in the external air stream EXT along a plurality of different directions in order to generate an external air stream with aerodynamic disturbances.

According to a first aspect, with reference to FIG. 10, the vortex generating member 4' has a convex, preferably solid, shape so as to define a plurality of deflection faces 41' which are connected through projecting ridges 42'. According to a second aspect, with reference to FIG. 11, the vortex generating member 4' comprises a plurality of projecting ridges 42' that are connected through concave portions 43' so as to significantly disturb the external air stream EXT.

A reduction in acoustic nuisance has been set out for a single ventilation opening 3, but it goes without saying that some or all of the ventilation openings 3 could be associated with members 4, 4' for disturbing the external air stream having identical or different natures.

When several disturbance elements 4, 4' are used together, they can be independent or connected together, for example, in a continuous manner between two adjacent ventilation openings 3.

Advantageously, such disturbance members 4, 4' make it possible to act on the cause of the acoustic nuisance, that is, on the external air stream EXT located upstream of the ventilation opening 3 so as to reduce generation of acoustic pressure fluctuations.

Figure 12:
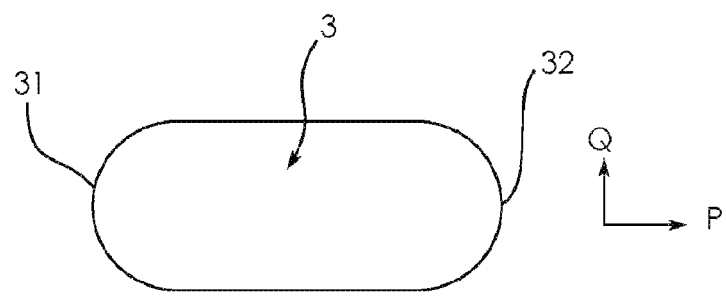
FIG. 12 is a top schematic representation of the perimeter of a ventilation opening according to prior art.

In a conventional manner, with reference to FIG. 12 representing a ventilation opening 3 according to prior art, the ventilation opening 3 has an oblong shape whose length is defined along axis P extending from upstream to downstream. The upstream edge 31 and the downstream edge 32 have a curvilinear shape so as to limit mechanical fatigue.

According to one aspect of the invention, with reference to FIGS. 12 to 18, the ventilation opening 3 comprises an upstream edge 31 whose circumferential profile is discontinuous to generate turbulence and/or a downstream edge 32 whose radial profile is aerodynamic to limit formation of pressure fluctuations. In other words, the profile of the edge of the ventilation opening 3 is modified so as to limit acoustic disturbances. An irregular upstream edge 31 allows relaxing of small turbulent aerodynamic structures that do not generate acoustic nuisance with the ventilation opening 3.

On the one hand, as will be set forth later, the upstream edge 31 can comprise a discontinuous circumferential profile to generate turbulence and thus disturb the upstream external air stream in the manner of an upstream disturbance member as set forth previously. In other words, the upstream edge forms a disturbance member integrated to the ventilation opening 3. Thus, the interaction with the ventilation opening 3 is controlled.

On the other hand, as will be set forth later, the downstream edge 32 can comprise an aerodynamic profile along the radial direction to limit formation of pressure fluctuations. Advantageously, this prevents the occurrence of hissing. Thus, antagonistic treatments of opposite edges 31, 32 of a ventilation opening 3, alternatively or cumulatively, allows the generation of acoustic nuisance to be counteracted.

Preferably, the ventilation opening 3 has a ratio of length, defined along axis P, to width, defined along axis Q, that is between 2 and 5.

According to one aspect of the invention, the profile of the upstream edge 31 in the circumferential direction has at least one point of curvature discontinuity 34 in the vicinity of which the tangent is modified by an angle ΔT greater than 60°, preferably less than 180°. Preferably, the upstream edge 31 comprises at least two, preferably, at least four turbulence generating patterns 33. Preferably, the turbulence generating patterns 33 are adjacent to each other. The circumferential profile is defined in the plane (P, Q).

Figure 13A:
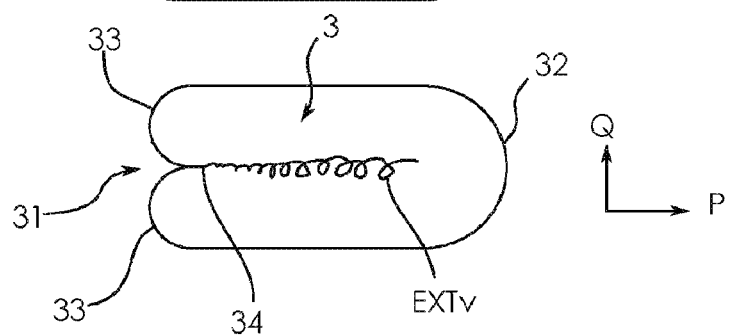
FIG. 13A, FIG. 13B, and FIG. 14 are top schematic representations of a ventilation opening having an upstream edge with scallops.
Figure 13B:
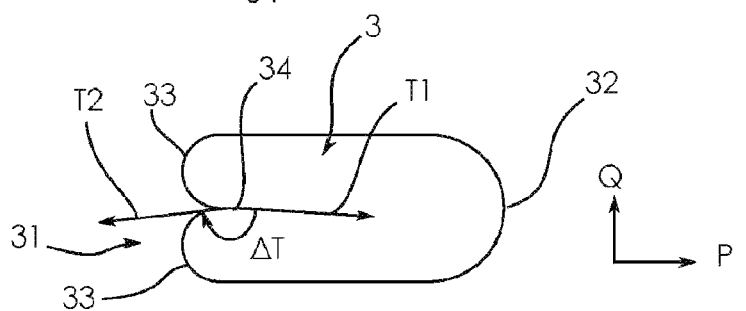

As illustrated in FIGS. 13A and 13B, there is represented an upstream edge 31 comprising two scallop-shaped turbulence generating patterns 33 so as to define at their interface a point of curvature discontinuity 34 that extends projecting to the center of the ventilation opening 3. FIG. 13B illustrates the tangent T1 of the first turbulence generating pattern 33 and the tangent T2 of the second turbulence generating pattern 33 which are separated by an angle ΔT of between 160° and 180°. Such a point of discontinuity 34 allows the flow of the external air stream EXT to be disturbed before it interacts with the downstream edge 32.

Figure 14:
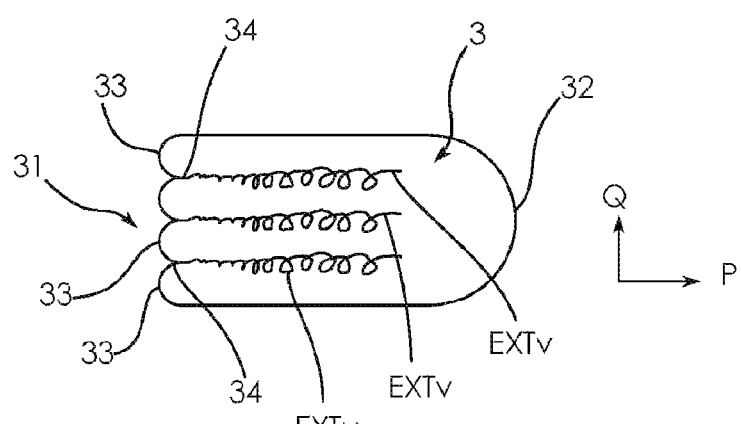

According to another embodiment illustrated in FIG. 14, the upstream edge 31 comprises four scallop-shaped turbulence generating patterns 33 and three points of curvature discontinuity 34 that extend projecting to the center of the ventilation opening 3 in order to generate a large number of aerodynamic disturbances.

Figure 15A:
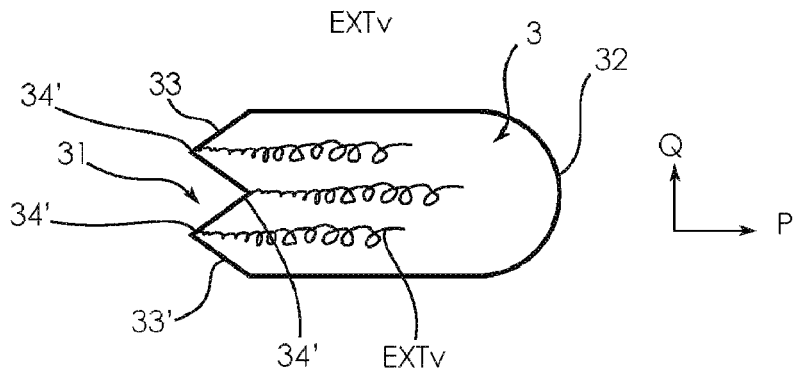
FIG. 15A, FIG. 15B, and FIG. 16 are schematic top views of a ventilation opening having an upstream edge with chevrons.
Figure 15B:
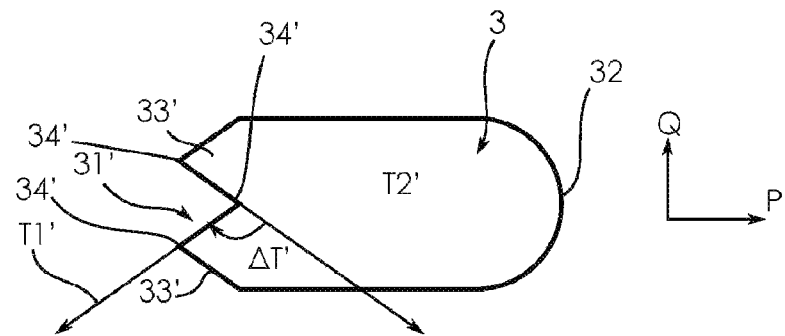

Similarly, according to another embodiment illustrated in FIGS. 15A and 15B, there is represented an upstream edge 31 comprising two chevron-shaped turbulence generation patterns 33' so as to define an inner point of curvature discontinuity 34' and a point of curvature discontinuity 34' at the interface with another generation pattern 33'. Also, in this example, the upstream edge 31 comprises 3 points of curvature discontinuity 34', 1 of which extends projecting to the center of the ventilation opening 3 and 2 of which extend projecting oppositely to generate a large number of aerodynamic disturbances. Similarly to FIG. 13B, FIG. 15B illustrates the tangent T1' of the first turbulence generating pattern 33' and the tangent T2' of the second turbulence generating pattern 33' being spaced apart by an angle ΔT' between 90° and 110°.

Figure 16:
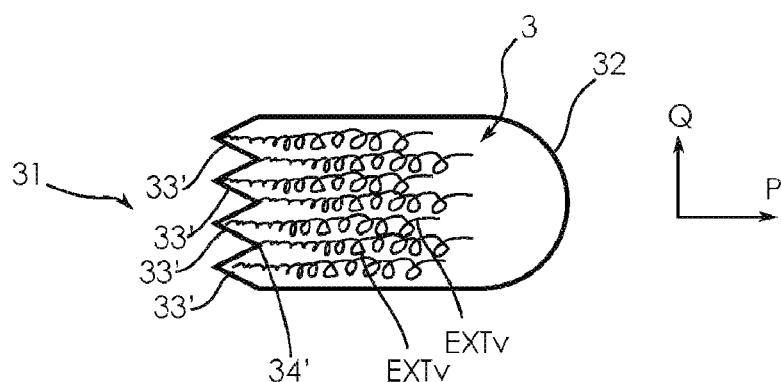

With reference to FIG. 16, the upstream edge 31 comprises four chevron-shaped turbulence generation patterns 33' and 7 points of curvature discontinuity 34', 3 of which project toward the center of the ventilation aperture 3 and 4 of which extend projecting oppositely in order to generate a large number of aerodynamic disturbances.

It goes without saying that the number and shape of turbulence generating patterns 33, 33' as well as the number, shape and position of the points of curvature discontinuity 34, 34' can vary as required. Preferably, the upstream edge 31 comprises between 1 and 8 points of curvature discontinuity 34, 34' for vortex generation depending on the desired acoustic effect.

Figure 17:
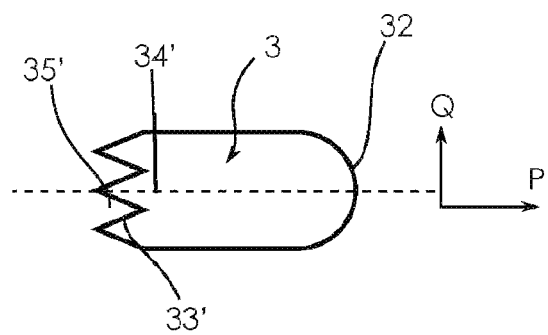
FIG. 17 and FIG. 18 are top schematic representations of a ventilation opening having a raised upstream portion.
Figure 18:
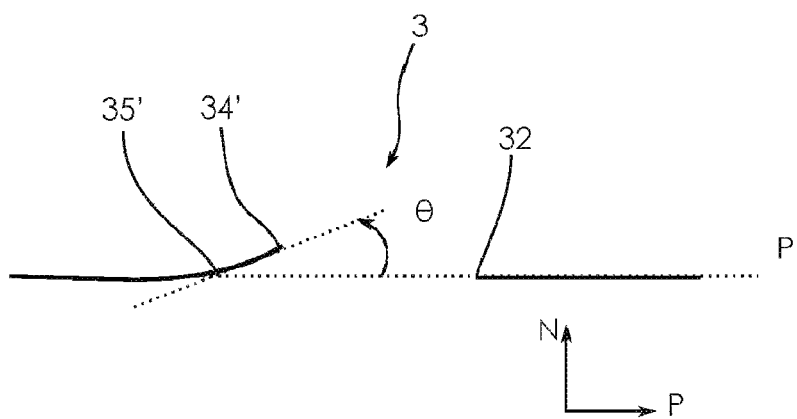

According to one aspect of the invention, the upstream edge 31 is inscribed in the aerodynamic lines and belongs to the plane (P, Q), that is, along an aerodynamic line. Such an upstream edge 31 is simple to make. According to another aspect, the upstream edge 31 comprises an outwardly projecting portion 35'. As an example, as illustrated in FIGS. 17 and 18 representing an upstream edge 31 comprising chevron-shaped turbulence generating patterns 33', a point of curvature discontinuity 34' extends projecting to the center of the ventilation opening 3 and extends projecting outwardly, that is, above the plane (P, Q) in which the ventilation opening 3 extends. In other words, the point of curvature discontinuity 34' makes it possible to generate turbulence in the manner of an upstream disturbance member 4, 4' as set forth previously by modifying the incidence of the external air stream EXT upstream of the ventilation opening 3. Preferably, the projecting portion 35' forms an angle θ with the overall plane (P, Q) of the ventilation opening 3 that is less than 45°.

Advantageously, the profile of the upstream edge 31 is produced by mechanical cutting, water jet, laser or punching.

Figure 19:
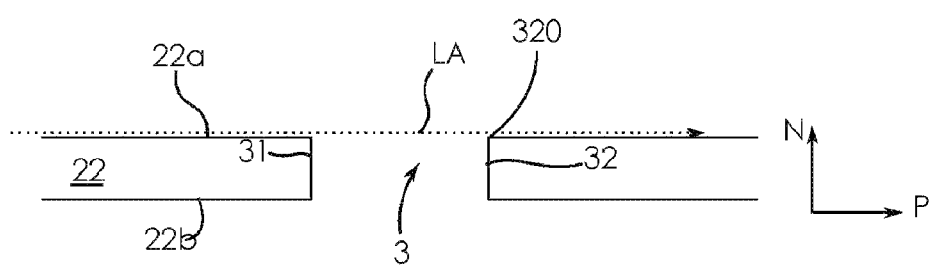
FIG. 19 is a schematic longitudinal representation in a cross-section view of a ventilation opening according to prior art.

In a conventional manner, with reference to FIG. 19 representing a ventilation opening 3 according to prior art, the ventilation opening 3 comprises a downstream edge 32 having a projecting ridge 320 in the plane (P, Q) of the ventilation opening 3, that is, at the interface with the external air stream EXT that sweeps the external wall 22. This interface line, hereinafter referred to as the "aerodynamic line LA", interacts with the projecting ridge 320 of the downstream edge 32 and generates hissing and other acoustic nuisance.

According to one aspect of the invention, as illustrated in FIGS. 20-24, the downstream edge 32 has an aerodynamic profile in the radial direction to limit formation of pressure fluctuations, that is, to avoid any shearing in the aerodynamic line LA by a projecting ridge. The radial profile is defined in the plane (P, N).

Preferably, the thickness of the downstream edge 32 is different from that of the upstream edge 31. Preferably, the thickness of the downstream edge 32 is enlarged relative to the upstream edge so as to form an aerodynamic radial profile. Advantageously, the aerodynamic radial profile has a continuous curvature, devoid of discontinuities, in particular, with respect to the aerodynamic line LA. Advantageously, the aerodynamic radial profile allows for a progressive deflection.

Figure 20:
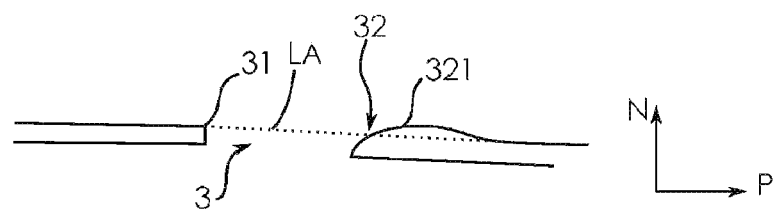
FIGS. 20-23 are schematic representations in a longitudinal cross-section view of ventilation openings according to the invention with a downstream edge having an aerodynamic radial profile.

As illustrated in FIG. 20, the downstream edge 32 has an upper aerodynamic, in particular rounded or domed, profile 321 at aerodynamic line LA. In this embodiment, only the upper portion of the downstream edge 32 is modified.

Figure 21:
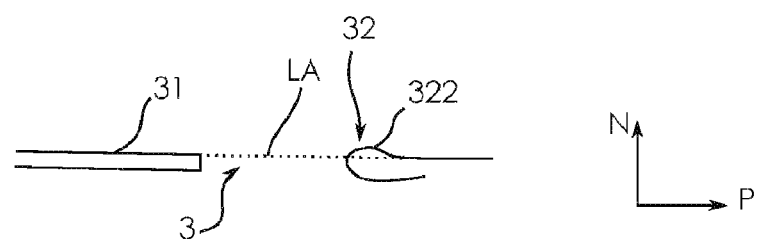
Figure 22:
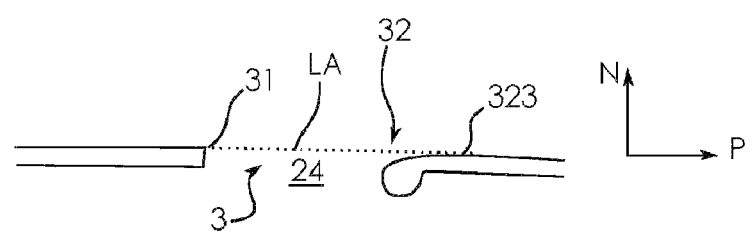
Figure 23:
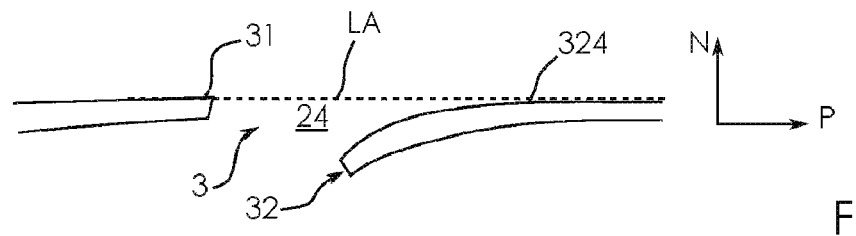

With reference to FIG. 21, it is suggested to form a fully rounded or domed downstream edge 32 so as to guide the aerodynamic line LA without turbulence both internally or externally thereto. As illustrated in FIGS. 22 and 23, the downstream edge 32 is sloped inwardly of the internal cavity 24 so as to avoid contact between the external air stream EXT and a projecting ridge. With reference to FIG. 22, the downstream edge 32 is deformed, in particular, with an inwardly directed protrusion. With reference to FIG. 23, the downstream edge 32 is deformed inwardly so as to lie below the aerodynamic line LA. Preferably, the radial profile of the downstream edge 32 can be made by local deformation of the material.

Figure 24:
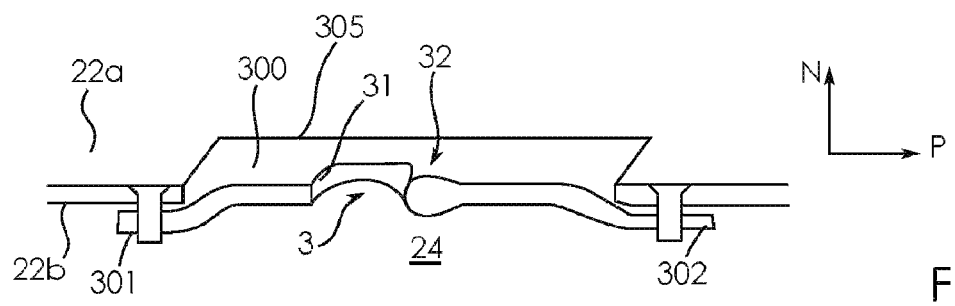
FIG. 24 is a schematic longitudinal representation in a partial cross-section view of a ventilation member mounted as an insert in a through opening for assembling.

According to one aspect of the invention, with reference to FIG. 24, the external wall 22 comprises a through opening 305 for mounting and the ventilation opening 3 is formed in a ventilation member 300 mounted in the through opening 305 for assembling, preferably from inside. Such an embodiment is advantageous insofar as it allows a through opening 305 for assembling to be formed in a simple shape, without any particular aerodynamic restrictions in the external wall 22. Each ventilation member 300 can be manufactured independently and advantageously comprise upstream 31 and downstream 32 edges that are worked to reduce acoustic disturbances. Each ventilation member 300 can then be attached as an insert to a through opening 305 for assembling, in particular, at its upstream end 301 and downstream end 302 as illustrated in FIG. 24. Such an embodiment combines improved acoustic performance and ease of industrialization.

Modification of an upstream edge 31 and/or a downstream edge 32 of a ventilation opening 3 allows for the formation of a ventilation opening 3 with reduced acoustic impact.

A reduction in acoustic impact for a single ventilation opening 3 has been set forth, but it is understood that some or all of the ventilation openings 3 could comprise an upstream edge 31 and/or downstream edge 32 modified according to the invention.

According to one aspect of the invention, with reference to FIGS. 25-31, the air intake 2 comprises at least one acoustic member 5 mounted in the internal cavity 24 facing the ventilation opening 3. By facing the ventilation opening, it is meant that the acoustic member 5 is distant from the ventilation opening 3 so as not to disturb exhaust of the hot air stream FAC but aligned with the latter to allow treatment of the acoustic waves coming from said ventilation opening 3.

Thus, unlike a treatment of the acoustic excitation as taught in the first part, it is suggested here to treat the acoustic resonance as such by shifting frequencies off the resonant zones or even by attenuating acoustic waves. The sound amplification of acoustic nuisance is advantageously reduced.

Figure 25:
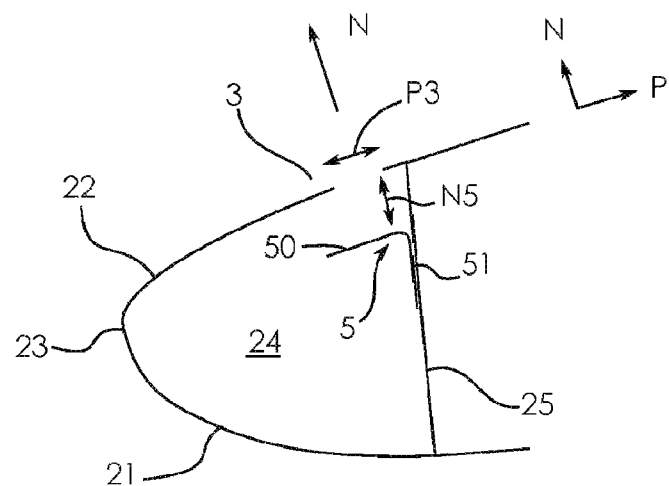
FIG. 25 and FIG. 26 are schematic representations of an acoustic member mounted in the internal cavity to the internal partition wall.
Figure 26:
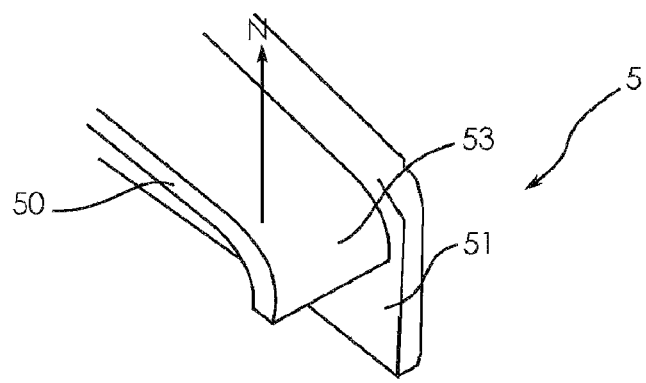

As illustrated in FIGS. 25 and 26, according to a first embodiment, the acoustic member 5 comprises an acoustic surface 50 extending in front of the ventilation opening 3. Here, the acoustic surface 50 is substantially planar to improve its efficiency but it could also be curved. Advantageously, the acoustic surface 50 is acoustically reflective so as to modify acoustic wavelengths and thus reduce resonances. Preferably, the treatment surface 50 is made of a metal or ceramic material in order to have good high temperature resistance.

As illustrated in FIG. 25, the ventilation opening 3 comprises a normal axis N and the projection of the acoustic member 5, the acoustic surface 50, onto the plane (P, Q) of the ventilation opening 3 along the normal axis N is larger than the ventilation opening 3 in order to allow containing all of the acoustic waves entering through the ventilation opening 3. Preferably, the acoustic surface 50 is substantially parallel to the plane (P, Q) of the ventilation opening 3. In other words, the acoustic surface 50 extends substantially orthogonal to the normal N of the ventilation opening 3. According to a preferred aspect, as illustrated in FIG. 26, the acoustic surface 50 comprises at its circumferential end a curved edge 53 so as to further allow guiding exhaust of the hot air stream FAC towards the ventilation opening 3.

In order to achieve optimal acoustic performance, with reference to FIG. 25, the acoustic member 5 is spaced from the ventilation opening 3 along the normal axis by a spacing distance N5 which is preferably less than 20 mm. This ensures optimal hot air exhaust as well as a shift of the acoustic frequencies into a frequency range that is less disturbing to the human ear.

In the embodiment of in FIGS. 25 and 26, the acoustic member 5 is in the form of a corner piece defining an acoustic surface 50 and a mounting surface 51. Preferably, the corner piece has an L-shaped cross-section. Such a simple structure allows for acoustic efficiency without significantly increasing mass. As illustrated in FIG. 25, the acoustic member 5 can be attached via its mounting surface 51 to the internal partition wall 25 of the internal cavity 24 (FIG. 25) or to the internal surface 22b of the external wall 22 (FIG. 27) so that the acoustic surface 50 extends into the immediate vicinity of the ventilation opening 3.

Figure 28:
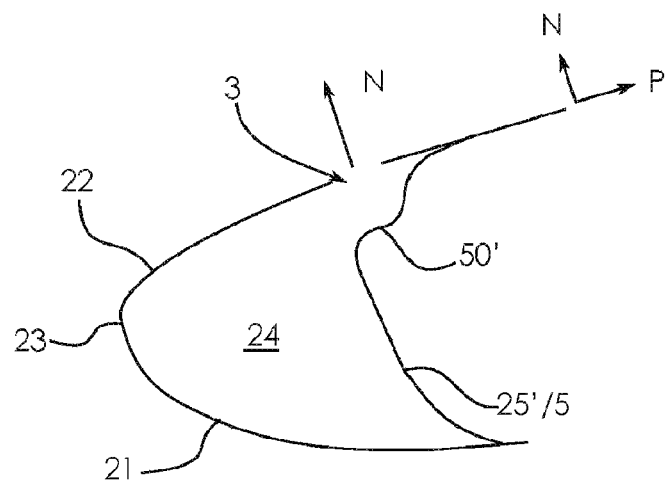
FIG. 28 is a schematic representation of an acoustic member integrated to the internal partition wall.

According to another aspect of the invention, with reference to FIG. 28, the internal partition wall 25' forms the acoustic member 5, this advantageously avoids the addition of an insert member. Preferably, the upstream face of the internal partition wall 25' comprises a concave portion 50' or flat part extending substantially orthogonal to the normal N of the ventilation opening 3 so as to form an acoustic surface reflecting the waves entering through the ventilation opening 3. In this way, advantage is taken of the internal partition wall 25' to treat acoustic waves without increasing mass of the air intake 20. Preferably, the upstream face of the internal partition wall 25' is overall convex and is locally deformed to form the concave portion 50' with acoustic surface.

Figure 29:
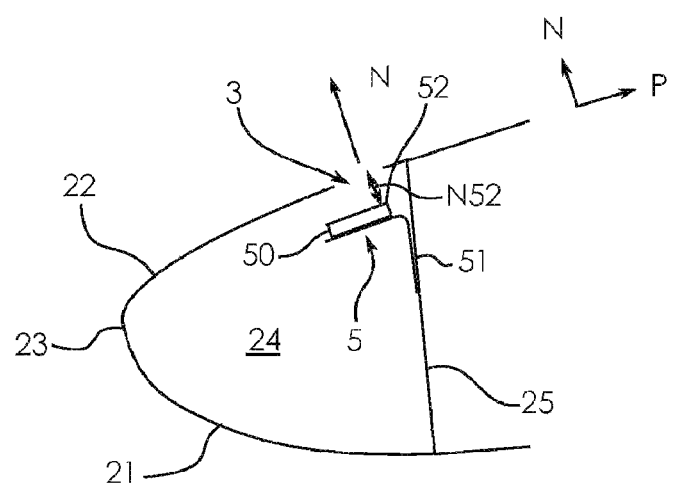
FIGS. 29-31 are schematic representations of an acoustic member comprising an absorption material.
Figure 30:
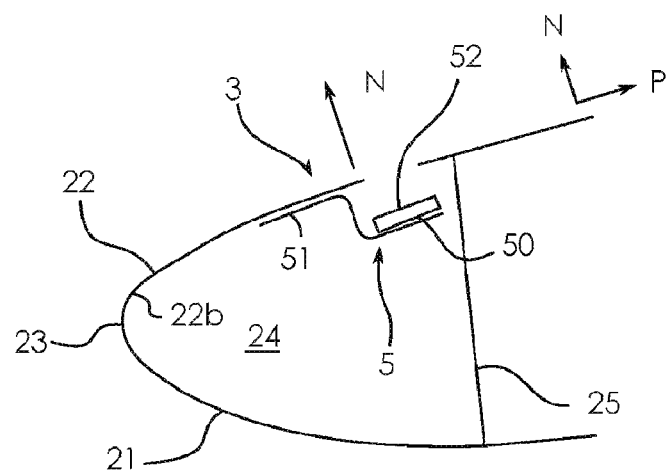
Figure 31:
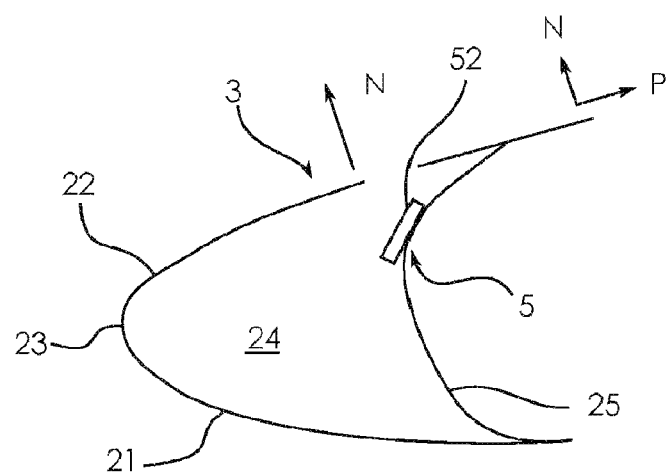

With reference to FIGS. 29 to 31, according to one aspect of the invention, the acoustic member 5 comprises at least one absorption material 52 so as to form an acoustic absorbing surface. Preferably, the absorbing material 52 is resistant to high temperatures, for example in the order of 350° C., which corresponds to the order of magnitude of the temperature of the hot air stream FAC used for de-icing.

By way of example, the absorption material 52 is of the porous, in particular, metallic, type with or without honeycomb. Of course, other materials could be suitable, for example, a metal foam, ceramic material with a perforated skin and the like.

Figure 27:
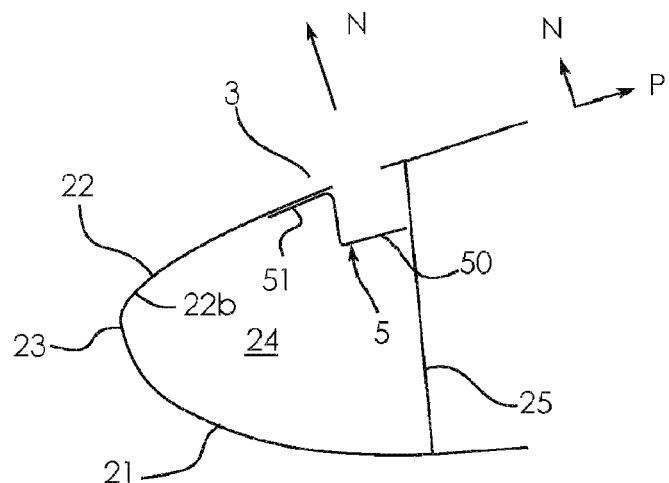
FIG. 27 is a schematic representation of an acoustic member mounted in the internal cavity to the external wall.

As illustrated in FIGS. 29 and 30, an absorption material 52 is positioned on the acoustic surface 50 of the embodiments of FIGS. 25 and 27 in order to significantly reduce acoustic nuisance. In such a case, the surface 50 is common and has only a support function, with the absorption material 52 performing the acoustic treatment by absorption.

In this embodiment, the absorption material 52 is spaced from the ventilation opening 3 along the normal axis by a spacing distance N52 which is greater than the length P3 of the ventilation opening 3. Even more preferably, the spacing distance N52 is less than twice the length P3 of the ventilation opening 3. Such a compromise ensures optimal hot air exhaust as well as an optimal acoustic absorption.

With reference to FIG. 31, the internal partition wall 25 comprises a convex upstream face pointing to the ventilation opening 3 and the absorption material 52 is directly attached to the internal partition wall 25 facing the ventilation opening 3. In other words, the acoustic member 5 is formed by the partition wall 25 to which the absorption material 52 is attached.

By virtue of the invention, acoustic waves are treated in a manner internal to the internal cavity 24, which makes it possible not to impact the overall size of the air intake 2 as well as the external wall 22. The acoustic member makes it possible to keep the acoustic frequencies away from the ranges of sensitivity of the human ear likely to cause acoustic nuisance.

A reduction in acoustic pollution has been set forth for a single ventilation opening 3, but it goes without saying that some or all of the ventilation openings 3 could be associated with acoustic elements 5. When several acoustic members 5 are used together, these can be independent or connected together, for example, continuously between two adjacent ventilation openings 3.

Advantageously, the various aspects of the invention can be combined with each other for a same ventilation opening or for different ventilation openings.

Also, a disturbance, deflection or vortex generating member can advantageously be associated with a ventilation opening 3 having an upstream edge 31 whose circumferential profile is discontinuous to generate turbulence and/or a downstream edge 32 whose radial profile is aerodynamic to limit pressure fluctuation.

Similarly, a disturbance, deflection or vortex generating member can advantageously be associated with an acoustic member, with or without absorption material.

Similarly, an acoustic member, with or without absorption material can advantageously be associated with a ventilation opening 3 having an upstream edge 31 whose circumferential profile is discontinuous to generate turbulence and/or a downstream edge 32 whose radial profile is aerodynamic to limit formation of pressure fluctuations.

According to one aspect of the invention, an acoustic member, with or without absorption material, can advantageously be associated, in a cumulative manner, with a ventilation opening 3 having an upstream edge 31 whose circumferential profile is discontinuous to generate turbulence and/or a downstream edge 32 whose radial profile is aerodynamic to limit formation of pressure fluctuations, as well as with a disturbance, deflection or vortex generating member.

The invention claimed is:

1. An air intake of an aircraft turbojet engine nacelle extending along an axis X in which an air stream circulates from upstream to downstream, the air intake comprising:
   an internal wall pointing to axis X to guide an internal air stream and an external wall opposite to the internal wall to guide an external air stream, the internal and external walls being connected through a leading edge and an internal partition wall so as to delimit an annular cavity, the air intake comprising:
   a hot air injector having a discharge for injecting a hot air stream circumferentially upstream and downstream into the annular cavity of the air intake to heat the internal wall, the external wall, and the leading edge by heat exchange;
   at least one ventilation opening formed in the external wall upstream of the hot air injector from the point of hot air stream injection into the air intake to allow exhaust of the hot air stream after heating the annular cavity; and
   at least one acoustic member positioned in the annular cavity and facing the ventilation opening, the at least one acoustic member is in the form of a corner piece comprising an acoustic surface and a mounting surface angled to the acoustic surface, the acoustic surface comprising at least one absorption material so as to modify acoustic resonant frequencies and/or attenuate acoustic waves formed in the annular cavity via the at least one ventilation opening, the acoustic surface of the at least one acoustic member being spaced from the external wall and the internal wall.

2. The air intake according to claim 1, wherein, with the at least one ventilation opening comprising a normal axis, the acoustic member comprises an acoustic surface extending orthogonal to the normal axis of the at least one ventilation opening.

3. The air intake according to claim 1, wherein, with the at least one ventilation opening comprising a normal axis, a projection of the acoustic surface onto a plane of the ventilation opening along normal axis is greater than the at least one ventilation opening.

4. The air intake according to claim 2, wherein the acoustic surface is spaced from the at least one ventilation opening along the normal axis by a spacing distance, the spacing distance being greater than a length of the at least one ventilation opening.

5. The air intake according to claim 2, wherein the at least one ventilation opening has a length and the acoustic surface is spaced from the at least one ventilation opening along the normal axis by a spacing distance, the spacing distance being less than twice the length of the at least one ventilation opening.

6. The air intake according to claim 1, wherein the absorption material forms the acoustic surface.

7. The air intake according to claim 1, wherein the acoustic member is attached to an internal surface of the external wall and the acoustic surface is spaced from the external wall.

8. The air intake according to claim 1, wherein the acoustic member is attached to the internal partition wall of the annular cavity.

9. The air intake according to claim 1, wherein the internal partition wall comprises a concave portion extending orthogonal to the normal of the ventilation opening.

10. An air intake of an aircraft turbojet engine nacelle extending along an axis X in which an air stream circulates from upstream to downstream, the air intake comprising:
    a shell having an internal wall facing axis X to guide an internal air stream and an external wall opposite to the internal wall to guide an external air stream, the internal wall and the external wall being connected through a leading edge and an internal partition wall so as to delimit an annular cavity, wherein the internal wall has an exterior surface and an interior surface and the external wall has an exterior surface and an interior surface, each exterior surface faces away from the axis X and each of the interior surface faces the axis X;
    the air intake comprising:
    a hot air injector having a discharge for injecting a hot air stream circumferentially upstream and downstream into the annular cavity of the air intake to heat the internal wall, the external wall, and the leading edge by heat exchange;
    at least one ventilation opening formed in the external wall to allow exhaust of the hot air stream after heating the annular cavity; and
    at least one acoustic member positioned in the annular cavity facing the at least one ventilation opening between the interior surface of the internal wall and the interior surface of the external wall, the acoustic member comprising an acoustic surface and the acoustic surface is spaced from the interior surface of the external wall, spaced from the interior surface of the internal wall, and generally parallel to a plane defined by the at least one ventilation opening so as to modify acoustic resonant frequencies and/or attenuate acoustic waves formed in the annular cavity via the at least one ventilation opening.

11. The air intake according to claim 10, further comprising a mounting surface angled to the acoustic surface, the mounting surface is attached to the internal partition wall.

12. The air intake according to claim 10, further comprising a mounting surface angled to the acoustic surface, the mounting surface is attached to the interior surface of the external wall.

13. The air intake according to claim 10, wherein the acoustic surface is integrated with the internal partition wall.

14. The air intake according to claim 10, wherein the acoustic surface is spaced from the at least one ventilation opening along a normal axis to the plane defined by the at least one ventilation opening by a spacing distance, the spacing distance being greater than a length of the at least one ventilation opening.

15. The air intake according to claim 10, wherein the at least one ventilation opening has a length and the acoustic surface is spaced from the at least one ventilation opening along a normal axis to the plane defined by the at least one ventilation opening by a spacing distance, the spacing distance being less than twice the length of the at least one ventilation opening.

16. The air intake according to claim 10, further comprising an absorption material located on the acoustic surface.

17. An air intake of an aircraft turbojet engine nacelle extending along an axis X in which an air stream circulates from upstream to downstream, the air intake comprising:
    a shell having an internal wall facing axis X to guide an internal air stream and an external wall opposite to the internal wall to guide an external air stream, the internal wall and the external wall being connected through a leading edge and an internal partition wall so as to delimit an annular cavity, wherein the internal wall has an exterior surface and an interior surface and the external wall has an exterior surface and an interior surface, each exterior surface faces away from the axis X and each of the interior surface faces the axis X;

the air intake comprising:

a hot air injector having a discharge for injecting a hot air stream circumferentially upstream and downstream into the annular cavity of the air intake to heat the internal wall, the external wall, and the leading edge by heat exchange;

at least one ventilation opening formed in the external wall to allow exhaust of the hot air stream after heating the annular cavity; and at least one acoustic member positioned in the annular cavity facing the at least one ventilation opening between the interior surface of the internal wall and the interior surface of the external wall, the acoustic member comprising an absorption material so as to modify acoustic resonant frequencies and/or attenuate acoustic waves formed in the annular cavity via the at least one ventilation opening, the absorption material being spaced from the exterior surface and the interior surface of the external wall and spaced from the interior surface of the internal wall.

18. The air intake according to claim 17, wherein the at least one acoustic member is part of the internal partition wall.

19. The air intake according to claim 17, wherein the at least one acoustic member comprises a mounting surface angled to an acoustic surface and wherein the mounting surface is attached to the internal partition wall.

* * * * *